US012742525B1

(12) United States Patent
English, Jr.

(10) Patent No.: US 12,742,525 B1

(45) Date of Patent: Sep. 22, 2026

(54) SCUBA LIGHT WITH OFFSET BATTERY CASES

(71) Applicant: Charles Lamar English, Jr., Saint Marks, FL (US)

(72) Inventor: Charles Lamar English, Jr., Saint Marks, FL (US)

( * ) Notice: Subject to any disclaimer, the term of this patent is extended or adjusted under 35 U.S.C. 154(b) by 2 days.

(21) Appl. No.: 19/263,670

(22) Filed: Jul. 9, 2025

(51) Int. Cl.

| | |
|---|---|
| ***F21L 4/02*** | (2006.01) |
| ***F21V 17/12*** | (2006.01) |
| ***F21V 31/00*** | (2006.01) |
| ***F21V 33/00*** | (2006.01) |
| ***F21W 111/10*** | (2006.01) |

(52) U.S. Cl.
CPC ................ *F21L 4/02* (2013.01); *F21V 17/12* (2013.01); *F21V 33/008* (2013.01); *F21V 31/00* (2013.01); *F21W 2111/10* (2013.01)

(58) Field of Classification Search
CPC .......... F21L 4/02; F21V 17/12; F21V 33/008; F21V 31/00; F21W 2111/10
See application file for complete search history.

(56) References Cited

U.S. PATENT DOCUMENTS 2,802,932 A 8/1957 Lambert
3,112,889 A 12/1963 Marmo et al.
4,788,631 A 11/1988 Fuller
5,570,948 A * 11/1996 Menke .................. H02J 7/0042 362/199
5,743,623 A 4/1998 Kerr
6,181,067 B1 * 1/2001 Dalton ...................... F21L 4/08 315/86
D445,520 S 7/2001 Kaufman, Jr.
7,303,306 B2 12/2007 Ross et al.
7,510,294 B2 3/2009 Steele et al.
8,230,522 B1 7/2012 Bell
8,344,543 B2 * 1/2013 Allen .................... H02J 7/0063 307/29
8,398,255 B2 3/2013 Starogiannis
D735,988 S 8/2015 Hull
9,383,072 B2 * 7/2016 Macor ................... F16B 7/0433
9,482,930 B1 11/2016 Ritch
9,752,762 B1 9/2017 Poe, III
10,344,924 B1 * 7/2019 Ganahl ................... F21V 15/04
10,617,198 B1 4/2020 De Michele
11,240,359 B2 2/2022 Wilson et al.
11,255,494 B1 2/2022 Matko
11,306,906 B1 * 4/2022 Blauer ................ F21V 21/0885
11,412,079 B1 8/2022 James
(Continued)

*Primary Examiner* — Tsion Tumebo
(74) *Attorney, Agent, or Firm* — Peter Loffler

(57) ABSTRACT

A handheld SCUBA light uses a D-shaped handle for grasping. A juncture member is attached on the top of the handle and has a light casing extending forwardly and a pair of battery casings each extending angularly and rearwardly therefrom. The battery casings each have a longitudinal axis passing therethrough, such that these two axis interest at a point forward of the battery casings. The longitudinal axis of the light casing either intersects the axis of the battery casings or is symmetrically aligned with the two longitudinal axes of the battery casings. By angularly offsetting the two battery casings, the wrist and forearm of the diver does not interfere with the travel of the casings whenever the diver rotates their wrists upward.

10 Claims, 8 Drawing Sheets

(56) References Cited

U.S. PATENT DOCUMENTS

| | | | | |
|---|---|---|---|---|
| 11,639,789 | B2 * | 5/2023 | Sharrah | F21L 4/005 362/183 |
| 2006/0082321 | A1 * | 4/2006 | Van Deursen | F16M 11/16 362/208 |
| 2006/0109645 | A1 | 5/2006 | Ferrari et al. | |
| 2008/0130268 | A1 | 6/2008 | Johnson et al. | |
| 2010/0039801 | A1 * | 2/2010 | Pelletier | F21L 2/00 362/184 |
| 2012/0307506 | A1 | 12/2012 | Gunn | |
| 2013/0194784 | A1 * | 8/2013 | Yu | F21V 21/145 362/108 |
| 2019/0331328 | A1 * | 10/2019 | Schorr, III | F21V 21/08 |
| 2020/0309358 | A1 * | 10/2020 | Schorr, III | A41D 1/002 |

* cited by examiner

SCUBA LIGHT WITH OFFSET BATTERY CASES

BACKGROUND OF THE INVENTION

1. Field of the Invention

The present invention relates to a handheld SCUBA light assembly wherein the battery tubes are offset from parallel with one another to permit full range of wrist motion by the diver.

2. Background of the Prior Art

One of the essential tools of a SCUBA diver is a flashlight. The diver uses the flashlight to see where the diver is going both for sightseeing as well as to see and avoid potential hazards. When the diver is particularly deep, very little light from the surface penetrates to depth and the flashlight is used to shine on the diver's swimming path. When diving in a cave or a reef, artificial such as a wreck or natural such as coral, no natural light at all may be available, and the flashlight is the sole light source for the diver. Additionally, the light is used as a signal device for communicating with fellow divers. The light is such a critical element of diving, that most divers carry a backup flashlight should the main flashlight become inoperable for any reason.

While there are many types of flashlights used by divers, most divers gravitate to one of two types for their primary flashlight. The first type of flashlight used by many divers is a typical stick light which is essentially a long tubular member that holds the battery pack within the body of the cylinder with the light itself located at and dispatching its light from one end of tubular member. Some models of this type of flashlight have the light source dispatching its beam at an angle that is offset from the longitudinal axis of the body of the flashlight. The other type of primary flashlight preferred by many divers is the spotlight configuration. In this type of light, a relatively large and short body holds the battery and the light with a handle extending downwardly from the body. This type of light casts a wider but shallower light relative to the stick light. The type of light chosen by the diver depends on what needs to be illuminated.

Both types of lights just described are effective in their duties of providing a light source and have been used by divers for a long time. Whole these lighting systems are effective, they have a drawback in that the diver must commit one hand to grasp and aim the light. This renders the hand unavailable for maneuvering over and around objects as the hand must grasp the light. In open water diving, this effective loss of hand use tends not to be problematic, however, in cave or reef diving, the diver often needs both hands to maneuver effectively, a task not permitted by a hand grasped flashlight.

To address this shortcoming, diving lights have been proposed that partially free the light grasping hand, allowing the hand to be used for maneuvering when needed. These types of lights used a D-shaped handle with the light and battery casings mounted to the upward facing straight leg of the handle with the light housing extending forwardly and the battery casings extending rearwardly of the handle. The diver passes their hand through the handle and grasps the curved portion of the handle with their hand so that the light and battery casings are located above the hand, the light dispatching forwardly of where the diver's knuckles are pointing. This type of light, while still requiring the light to be grasped by the diver's hand, partially frees the hand for other tasks as the hand is received within the handle and remains in place when the hand is being used for other purposes such as helping the diver pass through a hatch of a sunken ship. This type of light has gathered much support with divers over the last few years.

While this type of light system is effective at allowing the diver to use their hand for tasks beyond grasping of the light, the light system still possess drawbacks. The battery casings of the light system extend rearwardly from the hand-grasped handle and are positioned just above the diver's wrist and forearm when the light is in position. When the diver tries to rotate the light upwardly to illuminate an area above, the battery cases press upon the diver's forearm, preventing such light system rotation. This is a substantial drawback as the diver is forced to move their arm to broadcast the light beam to the desired area above instead of just executing a simple wrist flick. Turning the diver's forearm sideways and trying to dispatch the light to the side of the diver runs into the identical problem.

Accordingly, there is a need in the art to address the above stated shortcomings for diving lights. Specifically, a device is needed that allows a diver to maintain control of a handheld light yet still have partial functionality of the hand beyond light grasping duties. Such a device must not restrict wrist rotation when holding the light. Ideally, such a device introduces no additionally complexity to the handheld diver's light.

SUMMARY OF THE INVENTION

The SCUBA light with offset battery cases of the present invention addresses the aforementioned needs in the art by providing a versatile handheld light that permits a diver to use their light grasping hand for additional duties beyond light grasping. The SCUBA light with offset battery cases affords the diver a full range of motion for their wrist while holding the light eliminating the need for arm movement when simple wrist movement will suffice to throw the light beam in a desired direction. The SCUBA light with offset battery cases introduces no additional complexity in its use relative to current light systems. The SCUBA light with offset battery cases is of relatively simple design and construction, being produced using standard manufacturing techniques, so that the device is relatively inexpensive to produce and maintain making the device economically attractive to potential consumers of this type of device.

The SCUBA light with offset battery cases of the present invention is comprised of a D-shaped handle that has a curved body and a top leg. A juncture member is attached to the top leg. A light casing is attached to and extends forwardly from the juncture member. The light casing holds a light source of any appropriate type that issues a beam of light forwardly from the light casing. The light casing having a longitudinal axis passing therethrough. Aa first battery casing is attached to and extends rearwardly and angularly from the juncture member. The first battery casing has a first longitudinal axis passing therethrough. A first battery is disposed within the first battery casing. A second battery casing is attached to and extends rearwardly and angularly from the juncture member. The second battery casing has a second longitudinal axis passing therethrough. A second battery is disposed within the second battery casing. The first longitudinal axis and the second longitudinal axis are non-parallel with one another. The first longitudinal axis and the second longitudinal axis intersect at a crossover point that is located forwardly of the first battery casing and the second battery casing. The longitudinal axis of the light casing either passes through the crossover point or is symmetrically aligned with the crossover point. A first end cap is threadably attached to a first end of the first battery casing to provide access to the first battery therein while a second end cap is threadably attached to a second end of the first second casing to provide access to the second battery therein.

BRIEF DESCRIPTION OF THE DRAWINGS

Similar reference numerals refer to similar parts throughout the several views of the drawings.

DESCRIPTION OF THE PREFERRED EMBODIMENT

Figure 1:
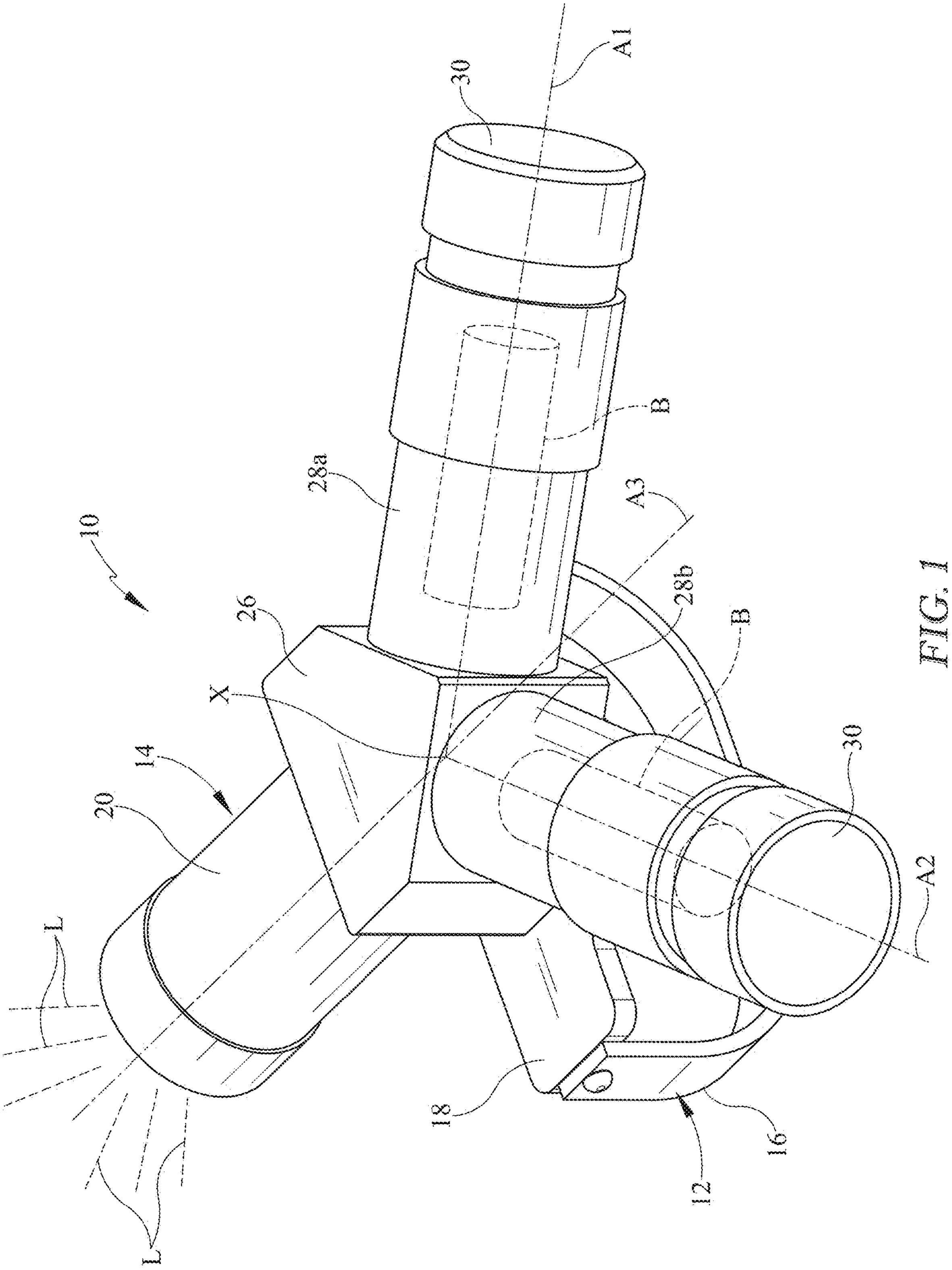
FIG. 1 is a rear perspective view of the SCUBA light with offset battery cases of the present invention.
Figure 2:
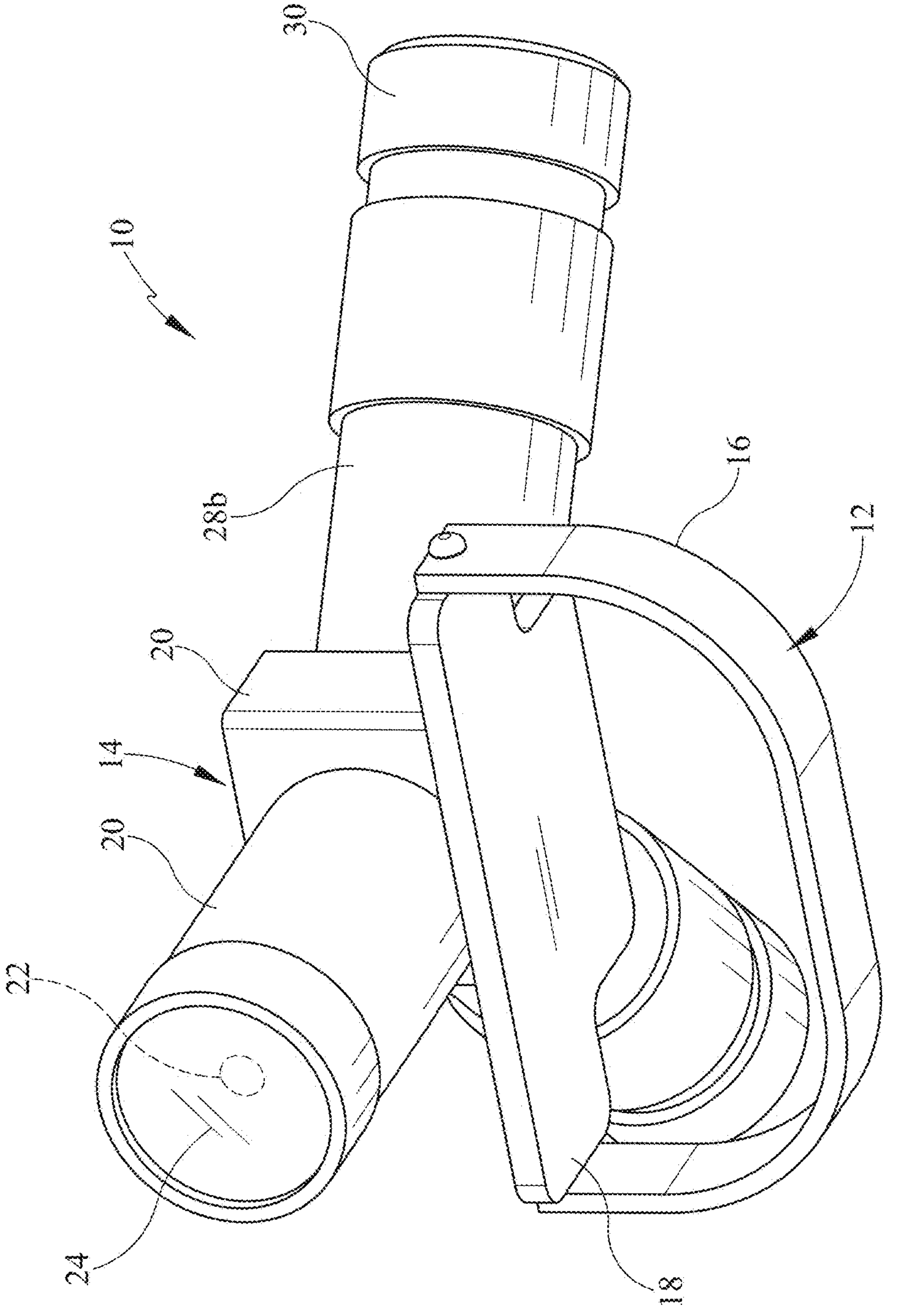
FIG. 2 is a front perspective view of the SCUBA light with offset battery cases.
Figure 3:
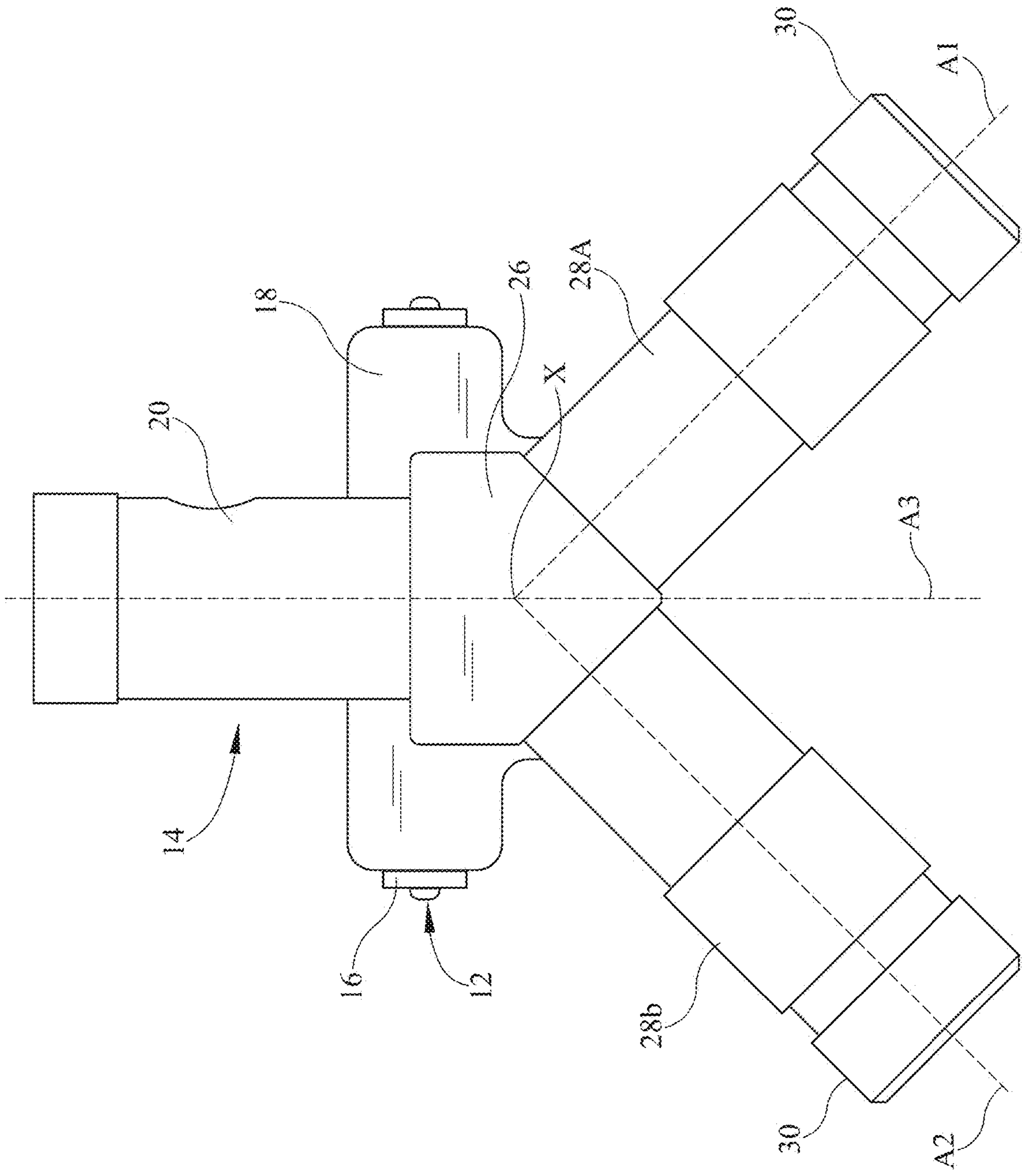
FIG. 3 is a top view of the SCUBA light with offset battery cases.
Figure 4:
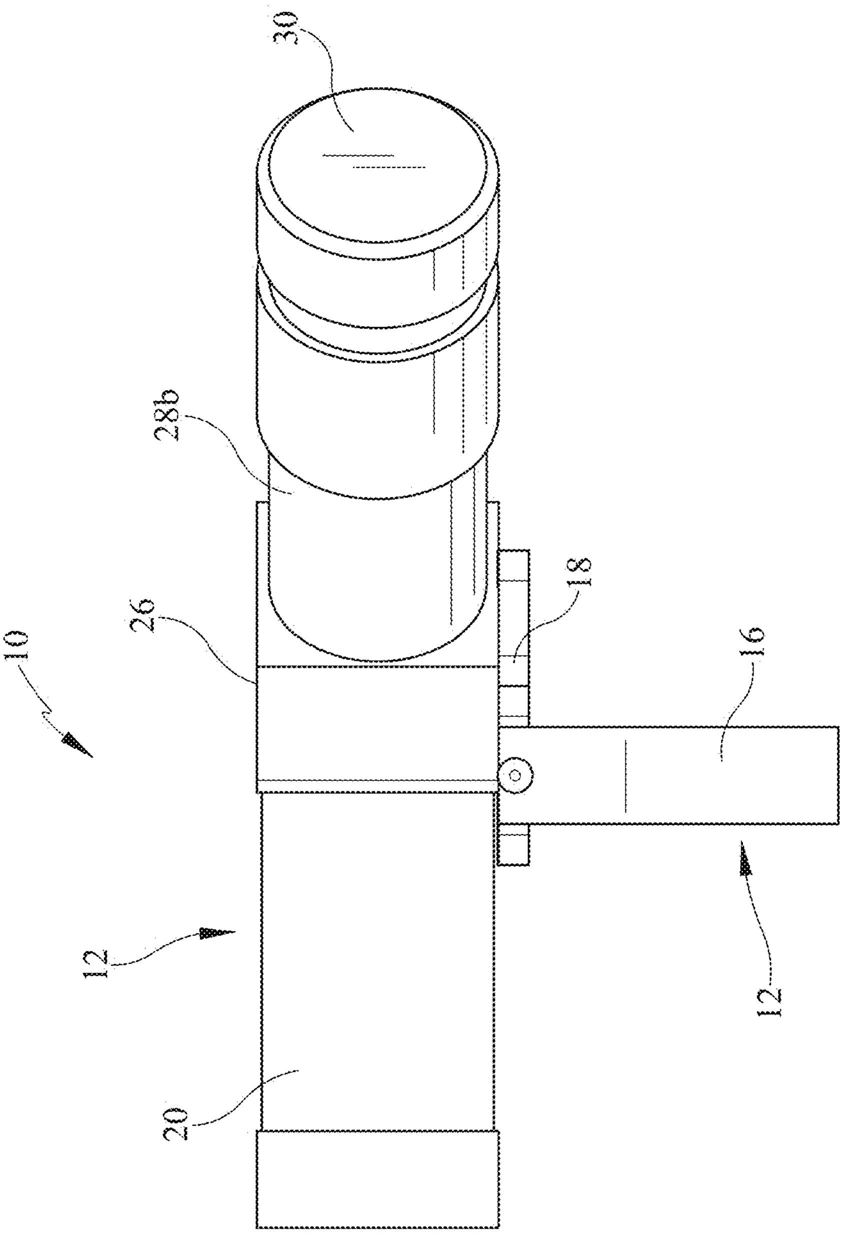
FIG. 4 is a left side view of the SCUBA light with offset battery cases.
Figure 5:
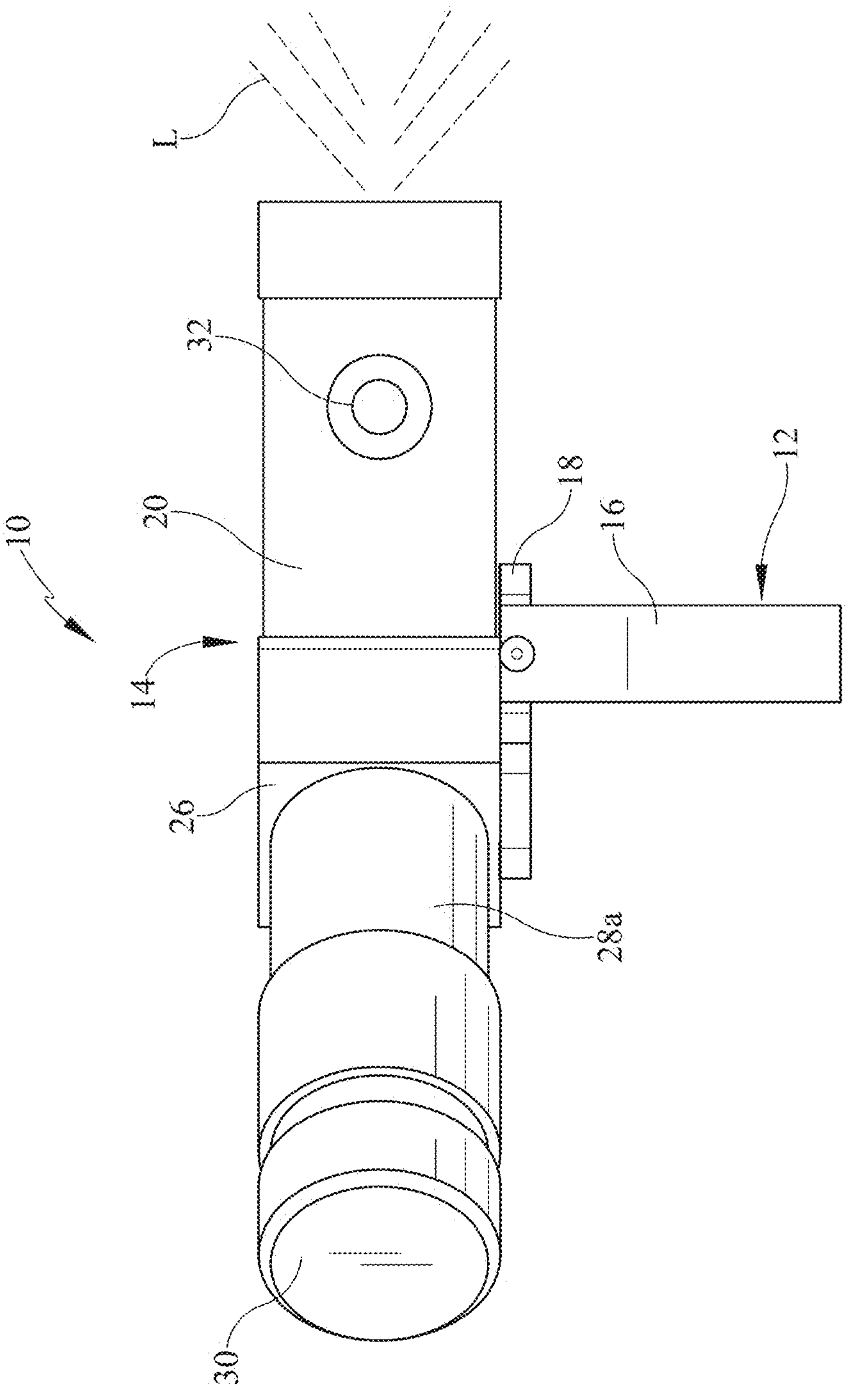
FIG. 5 is a right side view of the SCUBA light with offset battery cases.
Figure 6:
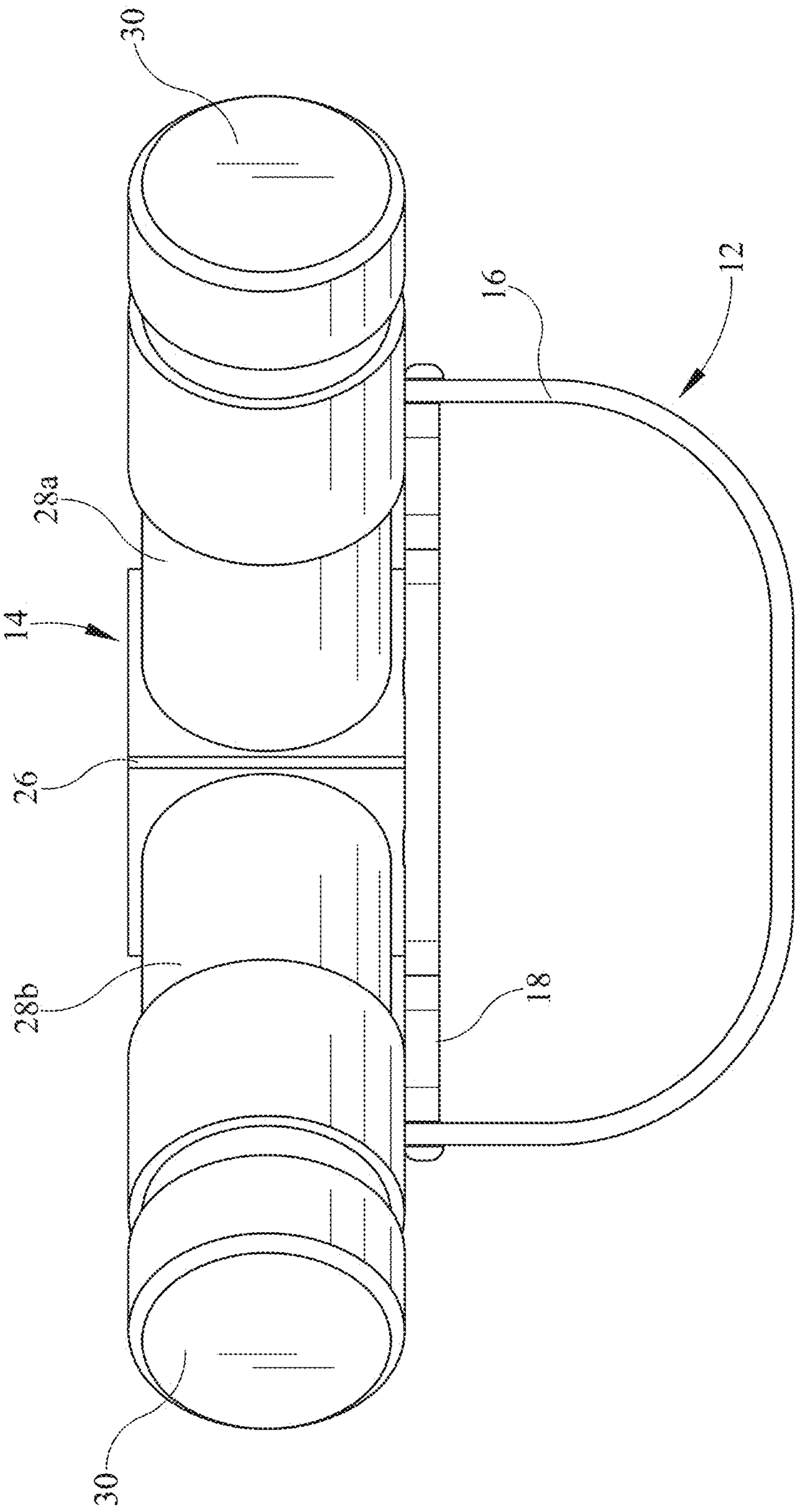
FIG. 6 is a rear view of the SCUBA light with offset battery cases.
Figure 7:
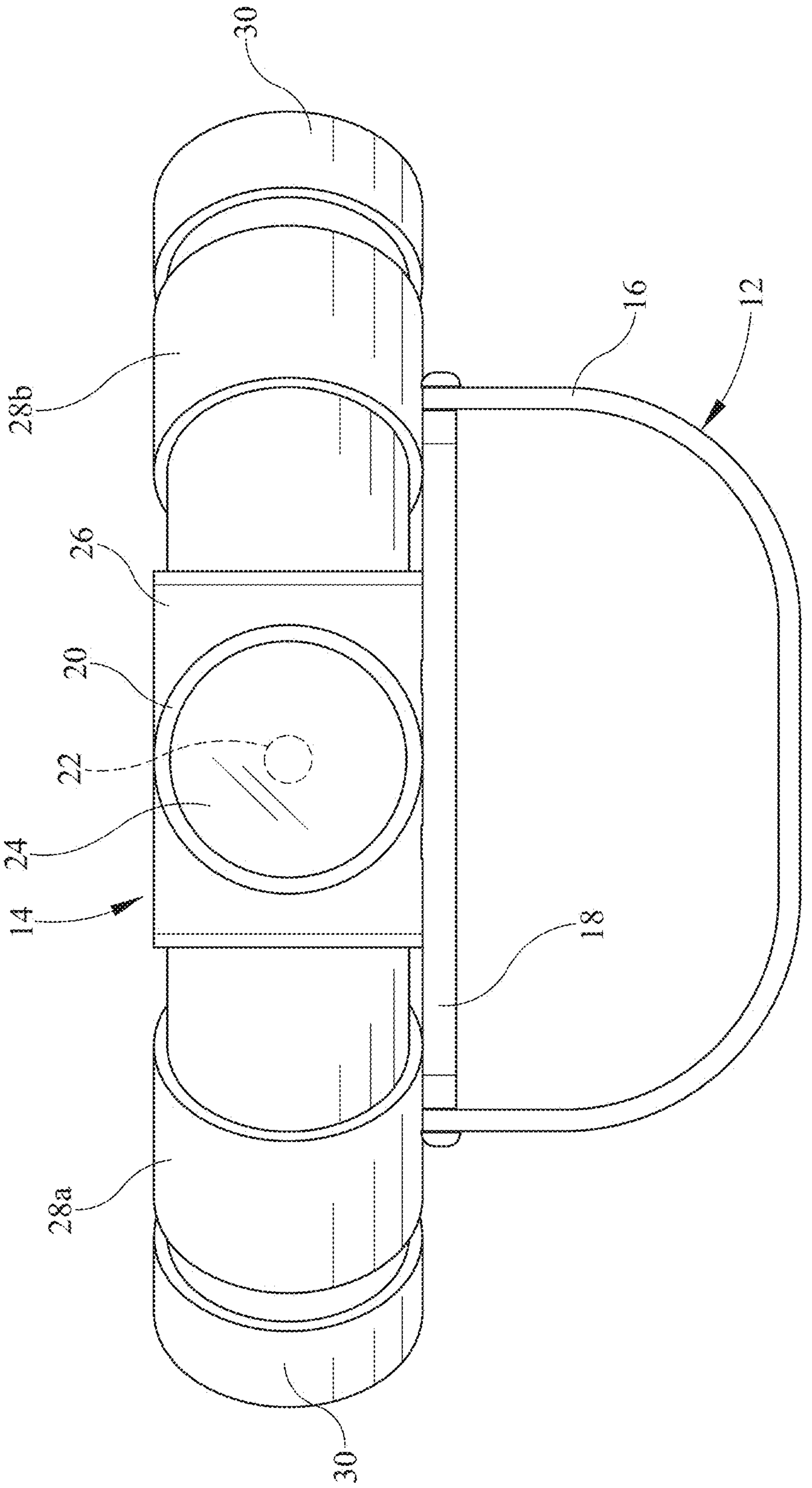
FIG. 7 is a front view of the SCUBA light with offset battery cases.

Referring now to the drawings, it is seen that the SCUBA light with offset battery cases of the present invention, generally denoted by reference numeral 10, is comprised of a generally D-shaped handle 12 and a light subsystem 14.

The handle 12 has a curved body 16 and a relatively straight top leg 18. The handle 12, which can be made as a unitary member or can have the top leg 18 attached, removably or otherwise, to the body 16 at the top leg's two ends, is made from an appropriate sturdy material, such as aluminum, plastic, carbon fiber, etc. The handle 12 is dimensioned so that a diver's hand passes through the handle 12 and is wrapped about the body 16 to grasp the handle 12 while diving.

The light subsystem 14 is comprised of a light casing 20 having a light source 22 of any appropriate type (Xenon, LED, HID, etc.,) therein that dispatches light L forwardly from the light casing 20 through an appropriate lens 24. The light casing 20 is attached threadably or otherwise to a juncture member 26. Extending backwardly and angularly from the juncture member 26 is a first battery casing **28*a* and a second battery casing 28*b*, each having one or more batteries B therein, the batteries B powering the light source 22. As seen, an end cap 30 is threadably attached to each of the battery casings 28*a* and 28*b* to provide access to the batteries B therein for removal for either recharge or replacement of the batteries B. As seen, the battery casings 28*a* and 28*b* are not parallel with one another and are angled relative to one another. The first longitudinal axis A1 passing through the first battery casing 28*a* is non-parallel with respect to the second longitudinal axis A2 passing through the second battery casing 28*b*. The crossover point X whereat the first longitudinal axis A1 and the second longitudinal axis A2 intersect is located forwardly of the two battery casings 28*a* and 28*b*, such that a third longitudinal axis A3 of the light casing 20 either passes through the crossover point X or is symmetrically aligned with the first longitudinal axis A1 and the second longitudinal axis A2 (symmetrically aligned means that at all points along the third longitudinal axis are equidistant from the first longitudinal axis A1 and the second longitudinal axis A2). It is understood that if the three longitudinal axis A1, A2, A3, are all on the same plane, then the third longitudinal axis A3 passes through the crossover point, however, if the third longitudinal axis A3 is offset from this plane (light casing located above or below the battery casings), then the third longitudinal axis passes above or below the crossover point respectively, but is equidistant from the first longitudinal axis A1 and the second longitudinal axis A2 at all points along the third longitudinal axis A3**.

The light subsystem 14 including the light casing 20, the first battery casing **28*a* and the second battery casing 28*b* and their end caps 30 are all made from a suitable material for diving such as aluminum, stainless steel, plastic, carbon fiber, etc., and the attachment of each component to other components is waterproofed in the appropriate manner for the depths to which the SCUBA light with offset battery cases 10 is to be certified. The light subsystem 14 may have a switch 32 for operating the light source 22 or one or both of the ends caps 30 can be used for switching the light source on and off via appropriate twisting the end cap 30 as is known in the art. The light subsystem 14 can be attached to the top leg 18 of the handle 12** in any appropriate fashion (screws, welding, adhesion, etc.).

To use the SCUBA light with offset battery cases 10 of the present invention, the diver passes their hand through the handle 12 in order to be able to grasp the body 16 of the handle as previously mentioned. The handle 12 encircles the diver's hand. As the battery casings **28*a* and 28*b* are angularly offset from one another (they are not parallel with each other), the battery casings 28*a* and 28*b* are not positioned over the diver's wrist and forearm when grasping the handle 12 and are in fact extending outwardly from either side of the wrist. Therefore, when the diver rotates the SCUBA light with offset battery cases 10 upwardly via wrist rotation, the battery cases 28*a* and 28*b*** do not contact the wrist and forearm of the diver, allowing the diver to be able to fully rotate their wrist upwardly. As with previous lights that use a pass through type of handle, the diver still has use of the light bearing hand beyond the holding of the light.

Figure 8:
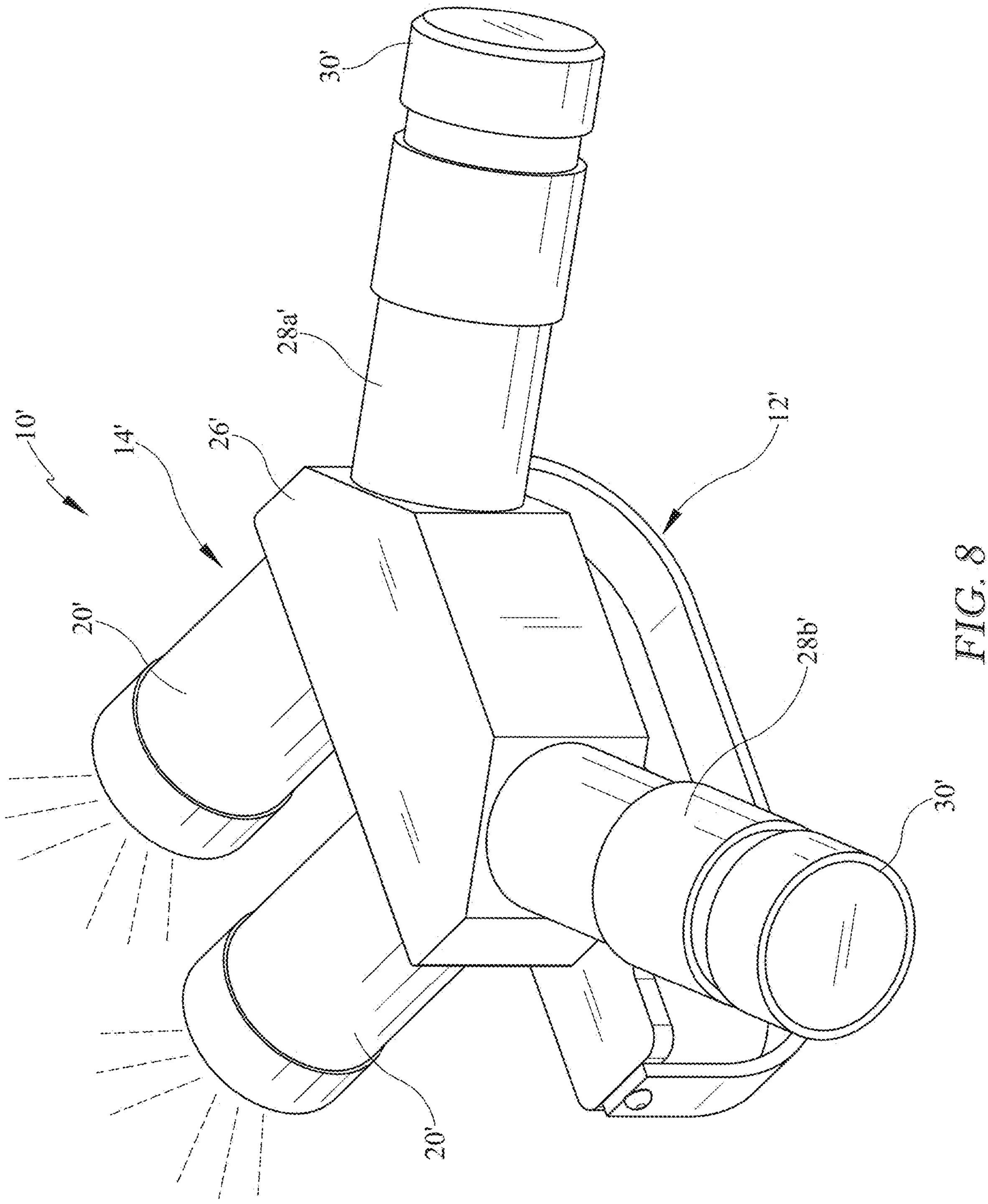
FIG. 8 is a perspective view of the SCUBA light with offset battery cases of the present invention having more than one light casing.

As seen in FIG. 8, the SCUBA light with offset battery cases 10' can be configured with multiple lights by having the light subsystem 14' have two (or more) light casings 20' having a light source of any appropriate type (Xenon, LED, HID, etc.,) therein that dispatches light L forwardly from the light casing 20'. The light casings 20' are attached threadably or otherwise to a juncture member 26'. Extending backwardly and angularly from the juncture member 26' is a first battery casing **28*a*' and a second battery casing 28*b*', each having one or more batteries therein. An end cap 30' is threadably attached to each of the battery casings 28*a*' and 28*b*' to provide access to the batteries therein for removal for either recharge or replacement of the batteries. As seen, the battery casings 28*a* and 28*b* are not parallel with one another and are angled relative to one another in similar fashion to the single light casing 20 embodiment described above—it being noted that as this juncture member 26' is relatively wider to the previously described juncture member 26, due to needing to accommodate a second light casing 20', the angular offset between the longitudinal axis between the two battery casings 28*a*' and 28*b*' at their juncture point need not be as large as the width of this juncture member 26' provides some of the wrist and forearm clearance for the battery casings 28***a*' and 28*b*'. The light subsystem 14' is attached to the handle 12' as previously described for the first embodiment.

The SCUBA light with offset battery cases can be configured so that multiple light subsystems can be provided so that one or more additional juncture member can be mechanically attached to the main juncture member and the batteries therein electrically coupled to the light source attached to the main light source(s) that are attached to the main juncture member and the batteries within the main battery casings electrically coupled to the light source(s) of the additional light subsystem, it being recognized that the additional light subsystems may be battery only without providing an additional light source. In this way, each battery can be used to power any or all of the light sources provided on the overall device and any of the light sources can be switched on or off as desired. One or more switches are provided to select the on/off status of each light source and which battery(s) to use to power which light source(s). Obviously, the electrical and mechanical coupling of the additional juncture member to the main juncture member is in waterproof fashion, as is the attachment of additional supplement juncture members to already attached supplemental juncture members.

While the invention has been particularly shown and described with reference to an embodiment thereof, it will be appreciated by those skilled in the art that various changes in form and detail may be made without departing from the spirit and scope of the invention.

I claim:

1. A SCUBA light system comprising:
a handle having a top leg;
a juncture member attached to the top leg;
a first battery casing attached to and extending rearwardly and angularly from the juncture member, the first battery casing having a first longitudinal axis passing therethrough;
a first battery disposed within the first battery casing;
a second battery casing attached to and extending rearwardly and angularly from the juncture member, the second battery casing having a second longitudinal axis passing therethrough;
a second battery disposed within the second battery casing;
a light casing threadably attached to and extending forwardly from the juncture member such that the light casing holds a light source that issues a beam of light forwardly from the light casing, the light casing having a third longitudinal axis passing therethrough; and
wherein the first longitudinal axis and the second longitudinal axis are non-parallel with one another and wherein the SCUBA light system is waterproof.

2. The SCUBA light system as in claim 1 wherein the first longitudinal axis and the second longitudinal axis intersect at a crossover point that is located forwardly of the first battery casing and the second battery casing.

3. The SCUBA light system as in claim 2 wherein the third longitudinal axis passes through the crossover point.

4. The SCUBA light system as in claim 2 wherein the third longitudinal axis is symmetrically aligned with the crossover point.

5. The SCUBA light system as in claim 1 further comprising:
a first end cap threadably attached to a first end of the first battery casing in order to provide access to the first battery therein; and
a second end cap threadably attached to a second end of the first second casing in order to provide access to the second battery therein.

6. A SCUBA light system comprising:
a D-shaped handle having a main body joined by a top leg;
a juncture member attached to the top leg;
a first battery casing attached to and extending rearwardly and angularly from the juncture member, the first battery casing having a first longitudinal axis passing therethrough;
a first battery disposed within the first battery casing;
a second battery casing attached to and extending rearwardly and angularly from the juncture member, the second battery casing having a second longitudinal axis passing therethrough;
a second battery disposed within the second battery casing;
a light casing threadably attached to and extending forwardly from the juncture member such that the light casing holds a light source that issues a beam of light forwardly from the light casing, the light casing having a third longitudinal axis passing therethrough; and
wherein the first longitudinal axis and the second longitudinal axis are non-parallel with one another and wherein the SCUBA light system is waterproof.

7. The SCUBA light system as in claim 6 wherein the first longitudinal axis and the second longitudinal axis intersect at a crossover point that is located forwardly of the first battery casing and the second battery casing.

8. The SCUBA light system as in claim 7 wherein the third longitudinal axis passes through the crossover point.

9. The SCUBA light system as in claim 7 wherein the third longitudinal axis is symmetrically aligned with the crossover point.

10. The SCUBA light system as in claim 6 further comprising:
a first end cap threadably attached to a first end of the first battery casing in order to provide access to the first battery therein; and
a second end cap threadably attached to a second end of the first second casing in order to provide access to the second battery therein.

* * * * *